US009780709B2

(12) United States Patent
Hardwicke, Jr. et al.

(10) Patent No.: US 9,780,709 B2
(45) Date of Patent: Oct. 3, 2017

(54) SYSTEM AND METHOD FOR OPTIMIZING WIND TURBINE OPERATION

(71) Applicant: General Electric Company, Schenectady, NY (US)

(72) Inventors: Edward Wayne Hardwicke, Jr., Simpsonville, SC (US); Cornelius Edward Holliday, Forest, VA (US); Rajni Kant Burra, Bangalore (IN)

(73) Assignee: General Electric Company, Schenectady, NY (US)

( * ) Notice: Subject to any disclaimer, the term of this patent is extended or adjusted under 35 U.S.C. 154(b) by 60 days.

(21) Appl. No.: 14/475,616

(22) Filed: Sep. 3, 2014

(65) Prior Publication Data
US 2016/0065105 A1 Mar. 3, 2016

(51) Int. Cl.
| H02P 9/00 | (2006.01) |
| F03D 7/04 | (2006.01) |
| F03D 9/00 | (2016.01) |
| H02J 3/38 | (2006.01) |
| G05F 1/14 | (2006.01) |
| F03D 9/25 | (2016.01) |

(52) U.S. Cl.
CPC ............... H02P 9/007 (2013.01); F03D 7/04 (2013.01); F03D 9/255 (2017.02); G05F 1/14 (2013.01); H02J 3/386 (2013.01); Y02E 10/763 (2013.01)

(58) Field of Classification Search
USPC .................................................... 290/44, 55
See application file for complete search history.

(56) References Cited

U.S. PATENT DOCUMENTS

| 6,512,966 B2 * | 1/2003 | Lof ....................... F03D 7/0284 290/44 |
| 7,245,038 B2 * | 7/2007 | Albertson ........... F02D 41/3029 290/40 B |

(Continued)

FOREIGN PATENT DOCUMENTS

| DE | 102008018748 A1 | 10/2009 |
| EP | 2711543 A1 | 3/2014 |

(Continued)

OTHER PUBLICATIONS

International Search Report and Written Opinion issued in connection with corresponding PCT Application No. PCT/US2015/044583 dated Nov. 13, 2015.

*Primary Examiner* — Tulsidas C Patel
*Assistant Examiner* — Charles Reid, Jr.
(74) *Attorney, Agent, or Firm* — Dority & Manning, P.A.

(57) ABSTRACT

The present disclosure is directed to a system and method for optimizing operation of a wind turbine. The method includes providing a voltage regulator between a power grid and the wind turbine. The voltage regulator is configured to control at least one voltage condition of the wind turbine. Another step includes monitoring, via one or more sensors, at least one operating condition and at least one voltage condition of the wind turbine. The method also includes comparing, via a controller, at least one of the operating condition or the voltage condition with a predetermined threshold to determine a margin-to-threshold ratio. Thus, a further step includes controlling the voltage regulator based on the comparison so as to maximize the margin-to-threshold ratio.

8 Claims, 5 Drawing Sheets

(56) References Cited

U.S. PATENT DOCUMENTS

| | | |
|---|---|---|
| 7,808,126 B2 | 10/2010 | Stiesdal |
| 7,994,658 B2 | 8/2011 | Cardinal et al. |
| 8,121,738 B2 | 2/2012 | Teichmann et al. |
| 8,610,306 B2 | 12/2013 | Kirchner |
| 8,698,334 B2 | 4/2014 | Bo et al. |
| 8,710,689 B2 | 4/2014 | Letas |
| 2005/0127680 A1* | 6/2005 | Lof ................ F03D 7/0284 290/44 |
| 2008/0265577 A1* | 10/2008 | Fortmann ........... F03D 7/028 290/44 |
| 2009/0021013 A1* | 1/2009 | Andresen ........... F03D 7/0272 290/44 |
| 2009/0096211 A1* | 4/2009 | Stiesdal ............. H02J 3/1835 290/44 |
| 2010/0133831 A1* | 6/2010 | Scholte-Wassink .. F03D 7/0292 290/44 |
| 2010/0264666 A1* | 10/2010 | Bo .................... H02J 3/1878 290/55 |
| 2012/0061964 A1* | 3/2012 | Kirchner ............ F03D 7/0284 290/44 |
| 2014/0159367 A1* | 6/2014 | Yin ................... F03D 7/028 290/44 |
| 2015/0148974 A1 | 5/2015 | Diedrichs |
| 2015/0184640 A1* | 7/2015 | Fortmann ........... F03D 7/028 290/44 |

FOREIGN PATENT DOCUMENTS

| | | |
|---|---|---|
| GB | 1517237 A | 7/1978 |
| WO | 2013167142 A1 | 11/2013 |
| WO | 2014012789 A1 | 1/2014 |

* cited by examiner

SYSTEM AND METHOD FOR OPTIMIZING WIND TURBINE OPERATION

FIELD OF THE INVENTION

The present disclosure relates generally to wind turbines, and more particular to a system and method for optimizing wind turbine operation via a voltage regulator.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having one or more rotor blades. The rotor blades transform wind energy into a mechanical rotational torque that drives one or more generators via the rotor. The generators are sometimes, but not always, rotationally coupled to the rotor through the gearbox. The gearbox steps up the inherently low rotational speed of the rotor for the generator to efficiently convert the rotational mechanical energy to electrical energy, which is fed into a utility grid via at least one electrical connection. Such configurations may also include power converters that are used to convert a frequency of generated electric power to a frequency substantially similar to a utility grid frequency.

Renewable energy power systems, such as the wind turbine described above, typically includes a power converter with a regulated DC link controlled by a converter controller. More specifically, wind driven doubly-fed induction generator (DFIG) systems or full power conversion systems, typically include a power converter with an AC-DC-AC topology. For many wind turbines, the operating space, and hence value to the customer, is limited by maximum voltages for one or more wind turbine components, e.g. the DC link and the generator rotor, inherent to DFIG systems. Further, grid operating practices and failures may lead to increased or decreased voltages on the generator stator, which reflect onto the generator rotor and the DC link. In order to mitigate such voltage transients, the converter controller must either shift the rotor and stator power factor away from customer demanded set points or increase the rotor converter modulation index leading to higher harmonics observed by the customer. Such limitations tend to be more significant for DFIG generators that operate at a high rated slip (RPM) or for generators that are experiencing an over-speed condition.

In an effort to mitigate the aforementioned issues, various wind turbine control technologies have been implemented that utilize a voltage regulator to compare grid voltage to a threshold voltage value. The control system then commands a step change in the voltage regulator to maintain a specific margin to mitigate grid disturbances. Further systems have utilized larger converters or dynamic brakes to control voltage levels for over-speed and power-for-power factor demand limitations. Many of the systems described above, however, may require additional cost and/or complexity.

Thus, the present disclosure is directed to an improved system and method that addresses the aforementioned issues. More specifically, the present disclosure is directed to a system and method for optimizing wind turbine operation via a voltage regulator that is configured to maximize the margin-to-voltage thresholds of various wind turbine components.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for optimizing operation of a wind turbine. The method includes providing a voltage regulator between a power grid and the wind turbine. The voltage regulator is configured to control at least one voltage condition of the wind turbine. Another step includes monitoring, via one or more sensors, at least one operating condition and at least one voltage condition of the wind turbine. The method also includes comparing, via a controller, at least one of the operating condition or the voltage condition with a predetermined threshold to determine a margin-to-threshold ratio. Thus, a further step includes controlling the voltage regulator based on the comparison so as to maximize the margin-to-threshold ratio.

In one embodiment, the method may also include monitoring, via one or more sensors, a grid voltage of the power grid and controlling the voltage regulator based on the grid voltage and the comparison so as to maximize the margin-to-threshold ratio. In another embodiment, the operating condition(s) may be any suitable operational parameter of the wind turbine. For example, in certain embodiment, the operating condition(s) may include any one of or a combination of the following: generator speed, VAR demand, a power factor, power output, or similar. Similarly, the voltage condition(s) may include any suitable voltage parameter of the wind turbine. For example, in particular embodiments, the voltage condition(s) may include any one of or a combination of the following: stator voltage, stator current, rotor voltage, rotor current, grid-side converter current, a DC link voltage, or similar.

In various embodiments, the voltage regulator may include a tap changer. In addition, the tap changer may be located between the power grid and a transformer of the wind turbine. In another embodiment, the step of controlling the voltage regulator based on the comparison so as to maximize the margin-to-threshold ratio may further include commanding a step change in the voltage regulator. In still additional embodiments, the wind turbine may include a wind-driven doubly-fed induction generator (DFIG).

In another aspect, the present disclosure is directed to a method for maximizing power output of a wind turbine. The method includes providing a voltage regulator between a power grid and the wind turbine. Another step includes monitoring, via one or more sensors, a voltage condition of the wind turbine. The method also includes comparing, via a controller, the voltage condition with a predetermined voltage threshold to determine a margin-to-threshold ratio. Thus, a further step includes controlling the voltage regulator based on the comparison so as to maximize the margin-to-threshold ratio. It should be understood that the method may also include any of the additional features and/or method steps as described herein in regards to the various embodiments.

In yet another aspect, the present disclosure is directed to a system for optimizing operation of a wind turbine. The system includes a voltage regulator operatively coupled between a power grid and the wind turbine, one or more sensors configured to monitor at least one of an operating condition, a voltage condition, or a grid voltage of the wind turbine, and a controller configured to perform one or more operations. The voltage regulator is configured to control at least one voltage condition of the wind turbine. The one or more operations performed by the controller may include comparing at least one of the operating condition or the voltage condition with a predetermined threshold to determine a margin-to-threshold ratio, and controlling the voltage regulator based on the comparison so as to maximize the margin-to-threshold ratio. It should be understood that the system may also include any of the additional features as described herein in regards to the various embodiments.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for optimizing wind turbine operation via a voltage regulator. For example, in various embodiments, the voltage regulator may be an on-line tap changer configured between the power grid and a transformer of the wind turbine. In one embodiment, the tap changer may be controlled by the turbine or converter controller so as to increase or decrease stator voltage during low and high speed operation and high VAR operation. More specifically, one or more sensors are configured to monitor at least one of an operating condition or a voltage condition of the wind turbine. Various operating conditions may include generator speed, VAR demand, a power factor, power output, or similar, whereas various voltage conditions may include stator voltage, stator current, rotor voltage, rotor current, grid-side converter current, a DC link voltage, or similar. The controller may also monitor the grid voltage. Thus, in one embodiment, the controller is configured to compare at least one of the operating condition or the voltage condition with a predetermined threshold to determine a margin-to-threshold ratio. Based on the comparison and optionally the grid voltage, the controller can command a step change in the voltage regulator so as to maximize the margin-to-threshold ratio.

The present disclosure has many advantages not present in the prior art. For example, the present disclosure provides flexibility in one or more voltage conditions, e.g. the stator voltage, for DFIG wind turbines so as to allow increased variable speed operation. Thus, at the lower end of the power curve, the wind turbine can operate at lower cut-in wind speeds, which result in more energy production at lower wind speeds and smoother power transitions when the wind turbine starts producing power. Smooth power transitions and lower cut-in speeds also results in lower thrust coefficients on the rotor and reduced wake produced by the rotor. Hence downstream wind turbines typically experience lesser wake and turbulence leading to more energy production on a farm level. Further, regulating the grid and stator voltage to alleviate electrical current restrictions or DC link/rotor voltage limitations can increase turbine operating space and reduce the likelihood that the wind turbine will fail to follow customer set points. In addition, the present disclosure minimizes adverse electrical characteristics, such as electrical noise and harmonic distortions.

Figure 1:
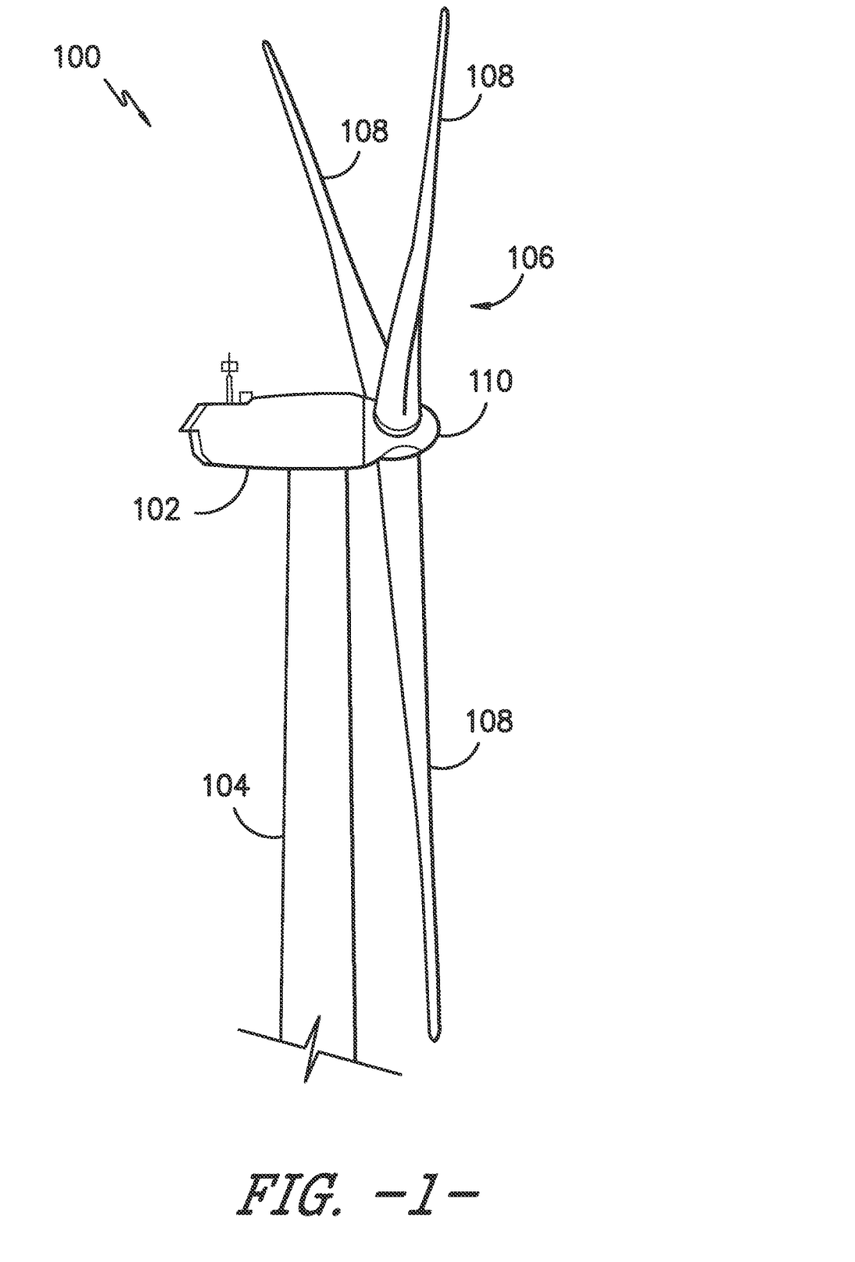
FIG. 1 illustrates one embodiment of a wind turbine according to the present disclosure.

Referring now to the drawings, FIG. 1 illustrates a perspective view of a portion of an exemplary wind turbine 100 according to the present disclosure. The wind turbine 100 includes a nacelle 102 housing a generator (not shown in FIG. 1). The nacelle 102 is mounted on a tower 104 (a portion of tower 104 being shown in FIG. 1). The tower 104 may have any suitable height that facilitates operation of wind turbine 100 as described herein. The wind turbine 100 also includes a rotor 106 that includes three rotor blades 108 attached to a rotatable hub 110. Alternatively, the wind turbine 100 may include any number of rotor blades 108 to facilitate operation of the wind turbine 100 as described herein. In one embodiment, the wind turbine 100 includes a gearbox (not shown in FIG. 1) operatively coupled to rotor 106 and a generator (not shown in FIG. 1).

Figure 2:
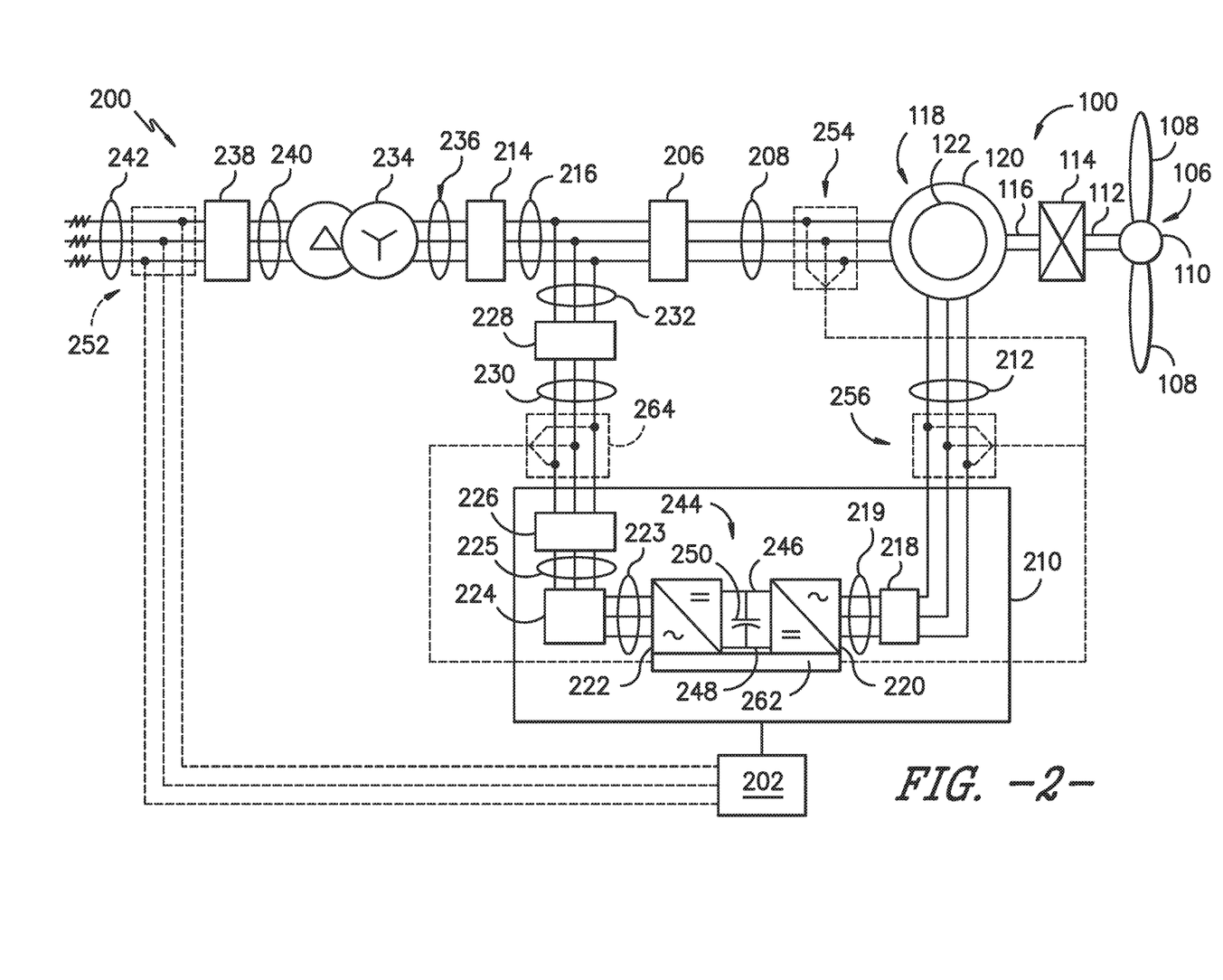
FIG. 2 illustrates one embodiment of an electrical and control system for a wind turbine according to the present disclosure.

FIG. 2 illustrates a schematic view of one embodiment of an electrical and control system 200 that may be used with the wind turbine 100. As shown, the rotor 106 includes rotor blades 108 coupled to the hub 110. The rotor 106 also includes a low-speed shaft 112 rotatably coupled to the hub 110. The low-speed shaft 112 is coupled to a gearbox 114 that is configured to step up the rotational speed of the low-speed shaft 112 and transfer that speed to a high-speed shaft 116. In one embodiment, the gearbox 114 has a step-up ratio of approximately 70:1. Alternatively, the gearbox 114 may have any suitable step-up ratio that facilitates operation of wind turbine 100 as described herein. As a further alternative, the wind turbine 100 may include a direct-drive generator that is rotatably coupled to rotor 106 without any intervening gearbox. The high-speed shaft 116 is rotatably coupled to the generator 118. In one embodiment, the generator 118 is may be a wound rotor, three-phase, double-fed induction (asynchronous) generator (DFIG) that includes a generator stator 120 magnetically coupled to a generator rotor 122. In an alternative embodiment, the generator rotor 122 may include a plurality of permanent magnets in place of rotor windings.

The generator stator 120 may also be electrically coupled to a stator synchronizing switch 206 via a stator bus 208. In one embodiment, to facilitate the DFIG configuration, the generator rotor 122 is electrically coupled to a bi-directional power conversion assembly 210 via a rotor bus 212. Alternatively, the generator rotor 122 may be electrically coupled to the rotor bus 212 via any other device that facilitates operation of the electrical and control system 200 as described herein. As a further alternative, the electrical and control system 200 is configured as a full power conversion system (not shown) that includes a full power conversion assembly similar in design and operation to the power conversion assembly 210 and is electrically coupled to the generator stator 120. The full power conversion assembly facilitates channeling electric power between the generator stator 120 and an electric power transmission and distribution grid (not shown). In one embodiment, the stator bus 208 transmits three-phase power from the generator stator 120 to stator synchronizing switch 206. The rotor bus 212 transmits three-phase power from the generator rotor 122 to the power conversion assembly 210. In one embodiment, the stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

In various embodiments, the power conversion assembly 210 may include a rotor filter 218 that is electrically coupled to the generator rotor 122 via the rotor bus 212. A rotor filter bus 219 electrically couples the rotor filter 218 to a rotor-side power converter 220. The rotor-side power converter 220 is electrically coupled to a line-side power converter 222. The rotor-side power converter 220 and line-side power converter 222 are power converter bridges including power semiconductors (not shown). In one embodiment, the rotor-side power converter 220 and the line-side power converter 222 are configured in a three-phase, pulse width modulation (PWM) configuration including insulated gate bipolar transistor (IGBT) switching devices (not shown) that operate as known in the art. Alternatively, the rotor-side power converter 220 and the line-side power converter 222 can have any configuration using any switching devices that facilitate operation of electrical and control system 200 as described herein. The power conversion assembly 210 may also be in electronic data communication with the turbine controller 202 to control the operation of the rotor-side power converter 220 and the line-side power converter 222.

Still referring to FIG. 2, a line-side power converter bus 223 may electrically couple the line-side power converter 222 to a line filter 224. In addition, a line bus 225 may electrically couple the line filter 224 to a line contactor 226. Moreover, the line contactor 226 may be electrically coupled to a conversion circuit breaker 228 via a conversion circuit breaker bus 230. Further, the conversion circuit breaker 228 may be electrically coupled to main transformer circuit breaker 214 via the system bus 216 and a connection bus 232. Alternatively, the line filter 224 is electrically coupled to the system bus 216 directly via the connection bus 232 and includes any suitable protection scheme (not shown) configured to account for removal of the line contactor 226 and the conversion circuit breaker 228 from the electrical and control system 200. The main transformer circuit breaker 214 may be electrically coupled to an electric power main transformer 234 via a generator-side bus 236. Further, the main transformer 234 may be electrically coupled to a grid circuit breaker 238 via a breaker-side bus 240. The grid circuit breaker 238 may be connected to the electric power transmission and distribution grid via a grid bus 242. The three power lines or leads exiting the drawing area on the left of FIG. 2 can correspond to a three-phase power line as described herein. In an alternative embodiment, the main transformer 234 may be electrically coupled to one or more fuses (not shown), rather than to grid circuit breaker 238, via breaker-side bus 240. In another embodiment, neither fuses nor grid circuit breaker 238 is used, but rather main transformer 234 may be coupled to the electric power transmission and distribution grid via breaker-side bus 240 and grid bus 242.

In one embodiment, the rotor-side power converter 220 is coupled in electrical communication with the line-side power converter 222 via a single direct current (DC) link 244. Alternatively, the rotor-side power converter 220 and the line-side power converter 222 are electrically coupled via individual and separate DC links (not shown). In certain embodiments, the DC link 244 may include a positive rail 246, a negative rail 248, and at least one capacitor 250 coupled between the positive rail 246 and the negative rail 248. Alternatively, the capacitor 250 may include one or more capacitors configured in series and/or in parallel between the positive rail 246 and the negative rail 248.

Figure 3:
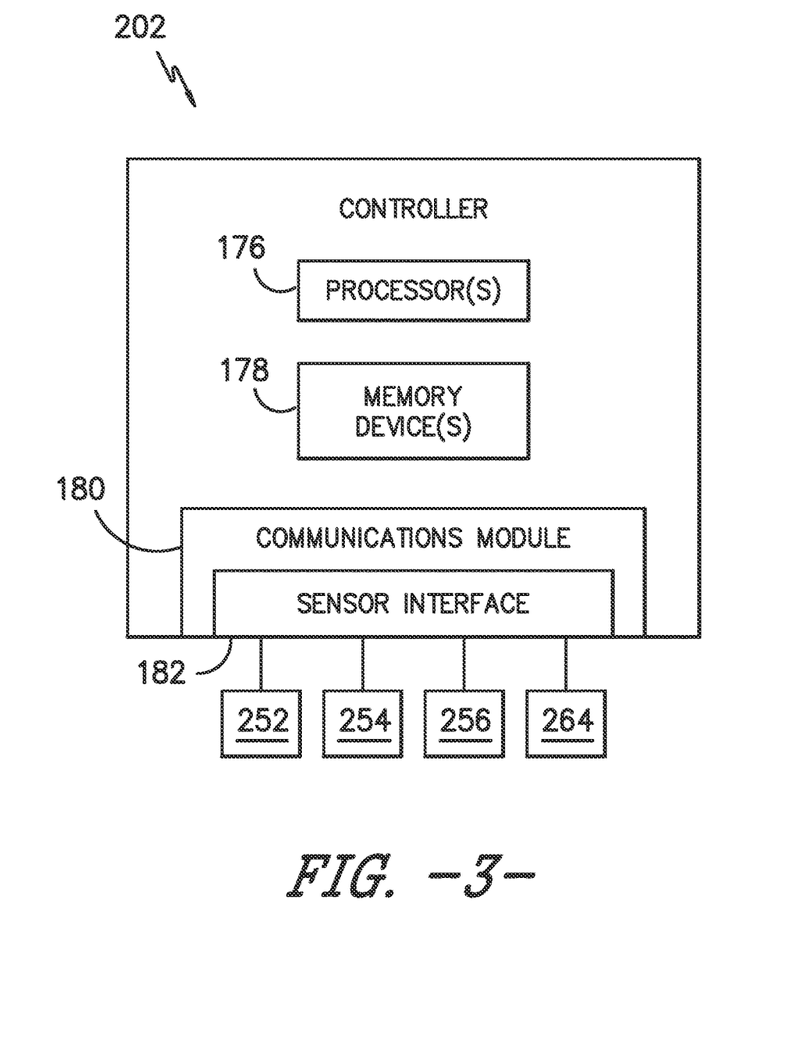
FIG. 3 illustrates a block diagram of one embodiment of a controller suitable for use with the wind turbine as shown in FIG. 1.

As mentioned, the electrical and control system 200 may include a turbine controller 202. For example, as shown in FIG. 3, the controller 202 may include one or more processor(s) 176 and associated memory device(s) 178 configured to perform a variety of computer-implemented functions and/or instructions (e.g., performing the methods, steps, calculations and the like and storing relevant data as disclosed herein). The instructions when executed by the processor 176 can cause the processor 176 to perform operations, including providing control commands (e.g. pulse width modulation commands) to the switching elements of the power conversion assembly 210 and other aspects of the electrical and control system 200. Additionally, the controller 202 may also include a communications module 180 to facilitate communications between the controller 202 and the various components of the electrical and control system 200, e.g. any of the components of FIG. 2. Further, the communications module 180 may include a sensor interface 182 (e.g., one or more analog-to-digital converters) to permit signals transmitted from one or more sensors 252, 254, 256, 264 to be converted into signals that can be understood and processed by the processors 176. It should be appreciated that the sensors 252, 254, 256, 264 may be communicatively coupled to the communications module 180 using any suitable means. For example, as shown in FIG. 3, the sensors 252, 254, 256, 264 are coupled to the sensor interface 182 via a wired connection. However, in other embodiments, the sensors 252, 254, 256, 264 may be coupled to the sensor interface 182 via a wireless connection, such as by using any suitable wireless communications protocol known in the art. As such, the processor 176 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 176 is also configured to compute advanced control algorithms and communicate to a variety of Ethernet or serial-based protocols (Modbus, OPC, CAN, etc.). Additionally, the memory device(s) 178 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 178 may generally be configured to store suitable computer-readable instructions that, when implemented by the processor(s) 176, configure the controller 202 to perform the various functions as described herein.

Referring particularly to FIG. 2, the turbine controller 202 may also be configured to receive a plurality of voltage and electric current measurement signals from a first set of voltage and electric current sensors 252. Further, the turbine controller 202 may be configured to monitor and control at least some of the operational variables associated with wind turbine 100. For example, in one embodiment, each of three voltage and electric current sensors 252 are electrically coupled to each one of the three phases of the grid bus 242. Alternatively, the voltage and electric current sensors 252 may be electrically coupled to the system bus 216. As a further alternative, the voltage and electric current sensors 252 may be electrically coupled to any portion of the electrical and control system 200 that facilitates operation of the electrical and control system 200 as described herein. As a still further alternative, the turbine controller 202 is configured to receive any number of voltage and electric current measurement signals from any number of voltage and electric current sensors 252 including, but not limited to, one voltage and electric current measurement signal from one transducer.

The electrical and control system 200 may also include a converter controller 262 configured to receive a plurality of voltage and electric current measurement signals. For example, in one embodiment, the converter controller 262 may receive voltage and electric current measurement signals from a second set of voltage and electric current sensors 254 coupled in electronic data communication with stator bus 208, a third set of voltage and electric current measurement signals from a third set of voltage and electric current sensors 256 coupled in electronic data communication with rotor bus 212, and/or a fourth set of voltage and electric current measurement signals from a fourth set of voltage and electric current sensors 264 coupled in electronic data communication with conversion circuit breaker bus 230. In one embodiment, the second set of voltage and electric current sensors 254 may be substantially similar to the first set of voltage and electric current sensors 252, and the fourth set of voltage and electric current sensors 264 may be substantially similar to the third set of voltage and electric current sensors 256. In addition, the converter controller 262 may be substantially similar to the turbine controller 202 and may be in electronic data communication with turbine controller 202. Moreover, in one embodiment, the converter controller 262 may be physically integrated within the power conversion assembly 210. Alternatively, the converter controller 262 may have any configuration that facilitates operation of electrical and control system 200 as described herein.

During operation, wind impacts the rotor blades 108 and the blades 108 transform wind energy into a mechanical rotational torque that rotatably drives the low-speed shaft 112 via the hub 110. The low-speed shaft 112 drives the gearbox 114 that subsequently steps up the low rotational speed of the low-speed shaft 112 to drive the high-speed shaft 116 at an increased rotational speed. The high speed shaft 116 rotatably drives the generator rotor 122. A rotating magnetic field is induced by the generator rotor 122 and a voltage is induced within the generator stator 120 that is magnetically coupled to generator rotor 122. The generator 118 converts the rotational mechanical energy to a sinusoidal, three-phase alternating current (AC) electrical energy signal in the generator stator 120. The associated electrical power is transmitted to the main transformer 234 via the stator bus 208, the stator synchronizing switch 206, the system bus 216, the main transformer circuit breaker 214, and the generator-side bus 236. The main transformer 234 steps up the voltage amplitude of the electrical power and the transformed electrical power is further transmitted to a grid via breaker-side bus 240, grid circuit breaker 238, and the grid bus 242.

In one embodiment, a second electrical power transmission path is also provided. For example, electrical, three-phase, sinusoidal, AC power may be generated within the generator rotor 122 and may be transmitted to the power conversion assembly 210 via the rotor bus 212. Within the power conversion assembly 210, the electrical power may be transmitted to the rotor filter 218 such that the electrical power is modified for the rate of change of the PWM signals associated with the rotor-side power converter 220. The rotor-side power converter 220 acts as a rectifier and rectifies the sinusoidal, three-phase AC power to DC power. The DC power is transmitted into the DC link 244. The capacitor 250 facilitates mitigating the DC link 244 voltage amplitude variations by facilitating mitigation of a DC ripple associated with AC rectification.

The DC power is subsequently transmitted from the DC link 244 to the line-side power converter 222 and the line-side power converter 222 acts as an inverter configured to convert the DC electrical power from the DC link 244 to three-phase, sinusoidal AC electrical power with pre-determined voltages, currents, and frequencies. This conversion is monitored and controlled via the converter controller 262. The converted AC power is transmitted from the line-side power converter 222 to the system bus 216 via the line-side power converter bus 223, the line bus 225, the line contactor 226, the conversion circuit breaker bus 230, the conversion circuit breaker 228, and the connection bus 232. The line filter 224 compensates or adjusts for harmonic currents in the electric power transmitted from the line-side power converter 222. The stator synchronizing switch 206 is configured to close to facilitate connecting the three-phase power from generator stator 120 with the three-phase power from power conversion assembly 210.

The conversion circuit breaker 228, the main transformer circuit breaker 214, and the grid circuit breaker 238 are configured to disconnect corresponding buses, for example, when excessive current flow may damage the components of electrical and control system 200. Additional protection components may also be provided including line contactor 226, which may be controlled to form a disconnect by opening a switch (not shown in FIG. 2) corresponding to each line of the line bus 225.

The power conversion assembly 210 is configured to receive control signals from the turbine controller 202. The control signals are based on sensed conditions or operating characteristics of the wind turbine 100 and the electrical and control system 200. The control signals are received by the turbine controller 202 and used to control operation of the power conversion assembly 210. Feedback from one or more sensors may be used by the electrical and control system 200 to control the power conversion assembly 210 via the converter controller 262 including, for example, the conversion circuit breaker bus 230, stator bus and rotor bus voltages, or current feedbacks via the second set of voltage and electric current sensors 254, the third set of voltage and electric current sensors 256, and the fourth set of voltage and electric current sensors 264. Using such feedback information, and for example, switching control signals, stator synchronizing switch control signals and system circuit breaker control (trip) signals may be generated in any known manner. For example, for a grid voltage transient with predetermined characteristics, the converter controller 262 will at least temporarily substantially suspend the IGBTs from conducting within the line-side power converter 222. Such suspension of operation of the line-side power converter 222 will substantially mitigate electric power being channeled through the power conversion assembly 210 to approximately zero.

Figure 4:
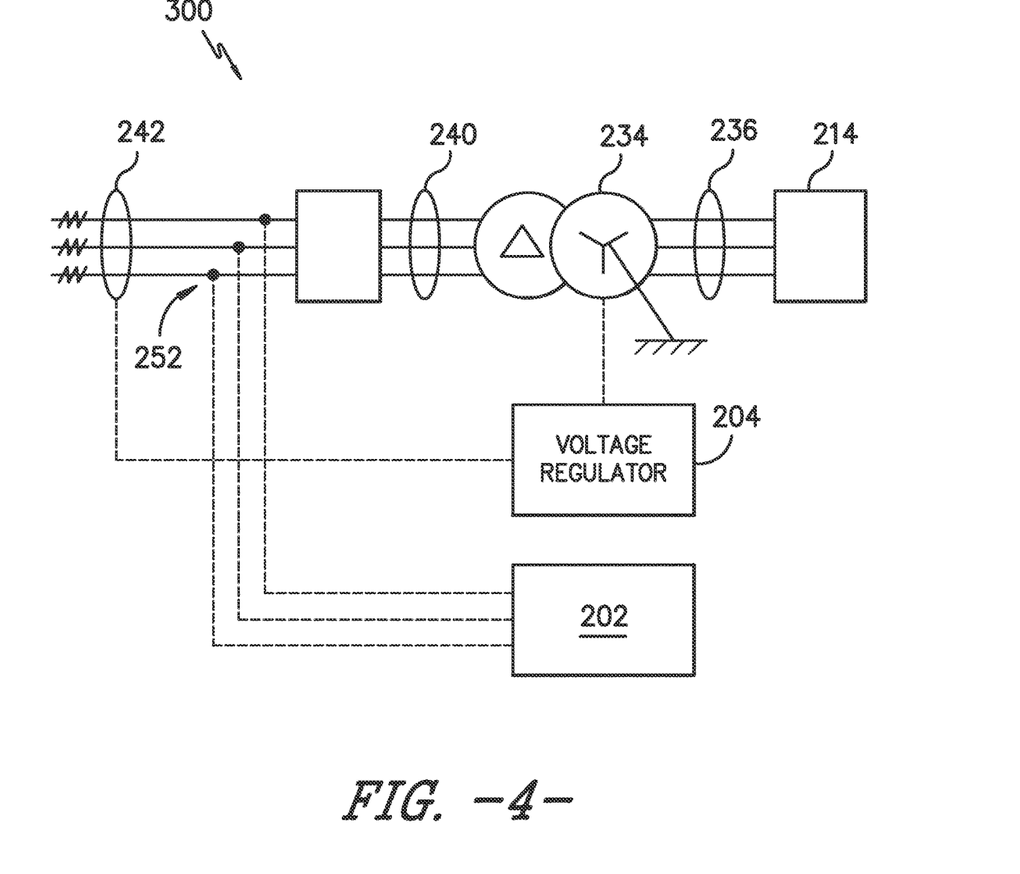
FIG. 4 illustrates one embodiment of a system for optimizing wind turbine operation according to the present disclosure.

Referring now to FIG. 4, one embodiment of a system 300 for optimizing operation of the wind turbine 100 is illustrated. As shown, the system 300 may utilize existing components of the electrical and control system 200 or may be integrated within the electrical and control system 200 of FIG. 2. More specifically, in one embodiment, the system 300 of the present disclosure includes at least one voltage regulator 204 operatively coupled between the power grid 242 and the main transformer 234 of the wind turbine 100. Alternatively, the voltage regulator 204 may be operatively coupled between the power grid 242 and any other suitable components of the wind turbine 100. Further, the voltage regulator 204 may be communicatively coupled to and controlled by the turbine controller 202 or the converter controller 262. More specifically, the voltage regulator 204 may be a tap changer. The term "voltage regulator" as used herein broadly encompasses a device that is designed to automatically maintain a constant voltage threshold. Thus, the voltage regulator 204 may be a simple feed-forward design or may include negative feedback control loops. Further, the voltage regulator 204 may be configured to regulate one or more AC or DC voltages. The term "tap changer" as used herein is meant to broadly encompass a type of voltage regulator coupled to a power transformer winding that allows a variable number of turns to be selected in discrete steps. Thus, a transformer with a variable-turns ratio can be produced, enabling stepped voltage regulation of the output. In addition, depending on the design, the tap selection may be made via an automatic or manual tap changer. Accordingly, the voltage regulator 204 is configured to control at least one voltage condition of the wind turbine 100.

The voltage regulator(s) 204 configuration may have any suitable configuration, including but not limited to a single voltage regulator applied to a single wind turbine 100 (as shown), a single voltage regulator applied to two or more wind turbines, a plurality of voltage regulators applied to a plurality of wind turbines, or any other suitable configuration.

In addition, in various embodiments, the sensors 252, 254, 256, 265 are configured to monitor one or more voltage conditions of the wind turbine 100, as well as one or more operating conditions of the wind turbine 100. In specific embodiments, the operating conditions of the wind turbine 100 may include any suitable operational parameter of the wind turbine, such as for example, generator speed, VAR demand, a power factor, power output, or similar. In addition, the voltage conditions of the wind turbine 100 may include any suitable voltage and/or current parameter of the wind turbine, such as for example, stator voltage, stator current, rotor voltage, rotor current, grid-side converter current, a DC link voltage, or similar.

Thus, after receiving the sensor data, the controller 202 is configured to compare the operating condition and/or the voltage condition with a predetermined threshold to determine a margin-to-threshold ratio. In addition, the controller 202 is configured to control the voltage regulator 204 based on the comparison so as to maximize the margin-to-threshold ratio. More specifically, the controller 202 may implement any suitable control methodology or algorithm so as to control the voltage regulator 204. For example, in one embodiment, the controller 202 may command a step change in the tap changer. More specifically, in one embodiment, the controller 202 may provide direct control of the tap changer electromechanical actuators or may provide a set point to an additional controller(s) located on or dedicated to the tap changer. In certain embodiments, to maximize power output, the controller 202 can adjust the voltage condition, e.g. stator voltage, via the voltage regulator 204 and adjust the operating condition, e.g. generator speed. For example, in one embodiment, such a control action may be accomplished by use of a transfer function or lookup tables. In such an embodiment, the flexibility in stator voltage control for the DFIG wind turbine 100 allows increased variable speed operation. For example, at the lower end of the power curve, the wind turbine 100 can operate at lower cut-in wind speeds, thereby resulting in more energy production at lower wind speeds and smoother power transitions when the turbine starts producing power. Smooth power transitions and lower cut-in speeds also results in lower thrust coefficients on the rotor and reduced wake produced by the rotor. Hence, downstream wind turbines will likely experience lesser wake and turbulence, thereby resulting in more energy production on a farm level.

The predetermined threshold for the various voltage conditions and/or operating conditions may be determined by the controller 202 in real-time or may be pre-programmed within the controller 202. For example, in certain embodiments, the predetermined voltage threshold is typically based on a maximum allowable voltage threshold of a wind turbine component such that the wind turbine component can operate without damage. Similarly, the predetermined operating threshold is typically based on a maximum allowable operating threshold, e.g. a maximum speed, of a wind turbine component such that the wind turbine component can operate without damage.

Still referring to FIG. 4, the sensors 252 may also be configured to monitor a grid voltage of the power grid 242. Thus, the controller 202 may control the voltage regulator 204 based at least in part on the grid voltage and the comparison of the operating condition to the margin-to-threshold ratio to threshold. Thus, when the grid voltage is high and the grid is not accepting power, the voltage regulator 204 can be maintained at or near a current operating set point. In contrast, when grid voltage is low and accepting power, the voltage regulator 204 can be controlled such that the margin-to-threshold ratio to threshold ratio is maximized.

Figure 5:
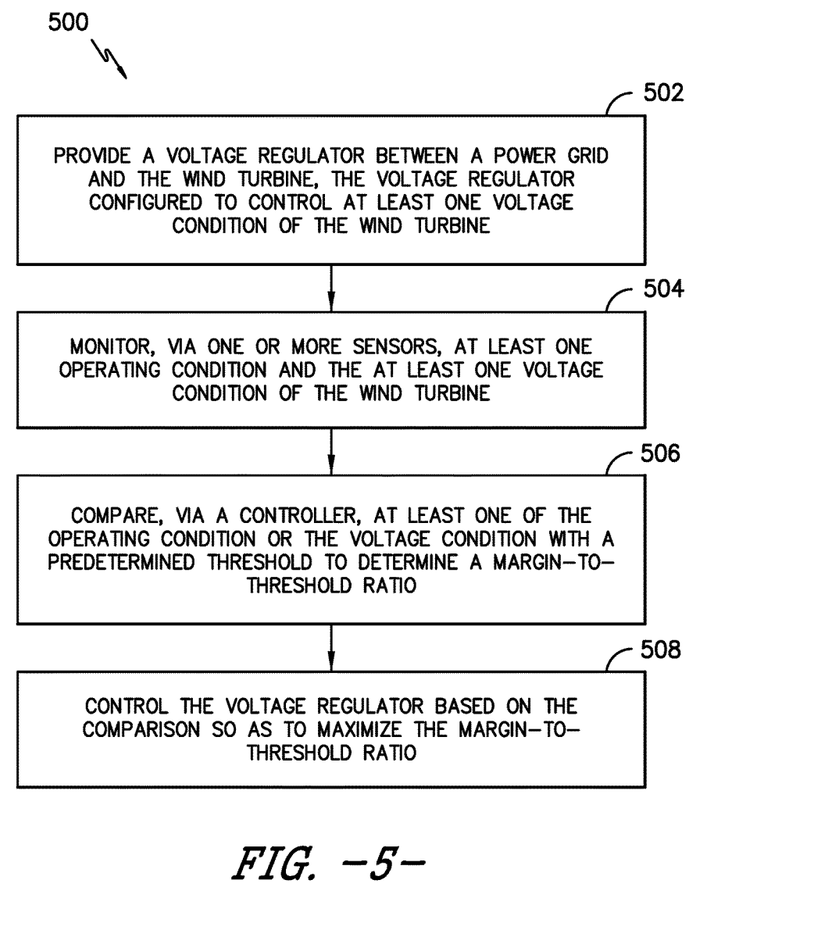
FIG. 5 illustrates one embodiment of a flow diagram of a method for optimizing operation of a wind turbine according to the present disclosure.

Referring now to FIG. 5, a flow diagram of an example method 500 for optimizing operation of a wind turbine is illustrated. As shown, the method 500 includes a step 502 of providing a voltage regulator between a power grid and the wind turbine. As mentioned, the voltage regulator is configured to control at least one voltage condition of the wind turbine 100. Another step 504 includes monitoring, via one or more sensors, at least one operating condition and at least one voltage condition of the wind turbine. The method 500 also includes comparing at least one of the operating condition or the voltage condition with a predetermined threshold to determine a margin-to-threshold ratio (step 506). Thus, a next step 508 includes controlling the voltage regulator based on the comparison so as to maximize the margin-to-threshold ratio.

Exemplary embodiments of a wind turbine, a control system for a wind turbine, and methods of controlling a wind turbine are described above in detail. The methods, wind turbine, and control system are not limited to the specific embodiments described herein, but rather, components of the wind turbine and/or the control system and/or steps of the methods may be utilized independently and separately from other components and/or steps described herein. For example, the control system and methods may also be used in combination with other wind turbine power systems and methods, and are not limited to practice with only the power system as described herein. Rather, the exemplary embodiment can be implemented and utilized in connection with many other wind turbine or power system applications, such as solar power systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for optimizing operation of a wind turbine, the method comprising:
    providing at least one tap changer between a power grid and the wind turbine;
    monitoring, via one or more sensors, at least one changing wind condition and at least one changing voltage condition;
    continuously determining, via a controller, a step change for the tap changer based on the changing wind condition and changing voltage condition;
    continuously applying the step changes to the tap changer to increase a voltage margin of a rotor of the wind turbine, wherein the increase in the voltage margin allows for increased variable speed operation of the wind turbine; and
    controlling the wind turbine based on at least one of an increased power coefficient or a lower thrust coefficient as a result of the increased variable speed operation.

2. The method of claim 1, further comprising monitoring, via the controller, a grid voltage of the power grid and controlling the voltage regulator based on the grid voltage and the comparison.

3. The method of claim 1, wherein the wind condition comprises wind speed.

4. The method of claim 1, wherein the voltage condition comprises any one of or a combination of the following: stator voltage, stator current, rotor voltage, rotor current, grid-side converter current, or DC link voltage.

5. The method of claim 1, wherein the tap changer is located between the power grid and a transformer of the wind turbine.

6. The method of claim 1, wherein the wind turbine comprises a wind-driven doubly-fed induction generator (DFIG).

7. A system for optimizing operation of a wind turbine connected to a power grid, the system comprising:
    a tap changer operatively coupled between a power grid and the wind turbine;
    one or more sensors configured to monitor at least one of a changing wind condition or a changing voltage condition of the wind turbine or the power grid; and,
    a controller configured to perform one or more operations, the one or more operations comprising:
        continuously determining, via a controller, a step change for the tap changer based on the changing wind condition and changing voltage condition;
        continuously applying the step changes to the tap changer to increase a voltage margin of a rotor of the wind turbine, wherein the increase in the voltage margin allows for increased variable speed operation of the wind turbine; and
        controlling the wind turbine based on at least one of an increased power coefficient or a lower thrust coefficient as a result of the increased variable speed operation.

8. The system of claim 7, wherein the tap changer is located between the power grid and a transformer of the wind turbine.

* * * * *